Figure 1:
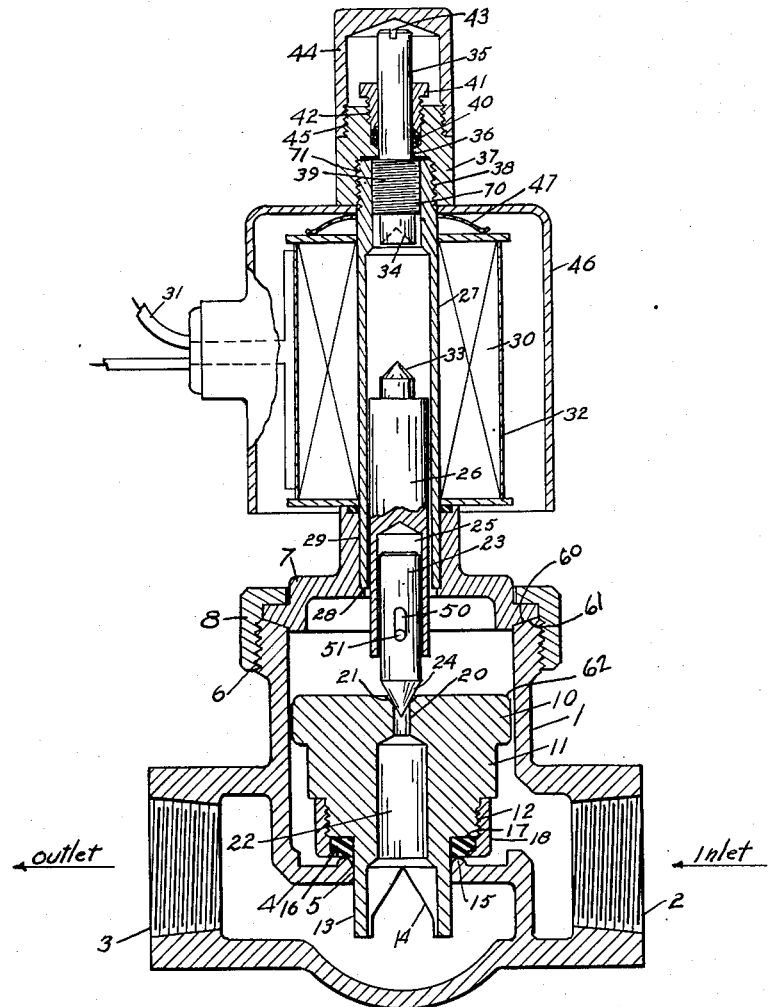

Jan. 20, 1953 W. G. MILLER 2,625,953
SELF-CLOSING VALVE
Filed Jan. 2, 1947

INVENTOR.
Wesley G. Miller
BY
Florian G. Miller
Atty.

UNITED STATES PATENT OFFICE 2,625,953

SELF-CLOSING VALVE

Wesley G. Miller, Erie, Pa., assignor to Hays Manufacturing Company, Erie, Pa., a corporation of Pennsylvania Application January 2, 1947, Serial No. 719,906

6 Claims. (Cl. 137—657)

This invention relates generally to valves and more particularly to remote controlled, self-closing valves utilized in a fluid line to pass a predetermined amount of liquid.

Self-closing valves now on the market are quite complicated and heavy in construction with the result that these valves are only used in industrial applications where a considerable amount of money can be spent for such a valve. These prior self-closing valves have not been practical for domestic use inasmuch as the cost thereof is prohibitive, they are too large and heavy, and they are too complicated. Furthermore, in these prior self-closing valves much shock and hammer occur in the closing of the valve resulting in breakage of pipes in some instances and in all instances, they cause loosening of scale, corrosion, rust, and the like in the pipes, whereby this deleterious matter gets into the valves and other delicate apparatus in the line to cause breakdown, leakage, and generally inefficient operation. The piston diameters in these prior self-closing valves have been comparatively large and the control orifices have been long and tortuous, making the clogging thereof a very frequent occurrence. These prior self-closing valves require many parts, orifices, cores, and by-pass mechanism to make them mechanically operative.

It is, accordingly, an object of my invention to overcome the above and other defects in self-closing valves and it is more particularly an object of my invention to provide a self-closing valve which is simple in construction, economical in cost, economical in manufacture, light in weight, and positive in operation.

Another object of my invention is to provide a self-closing valve wherein shock and hammer is eliminated.

Another object of my invention is to provide a self-closing valve in which a comparatively small single-unit piston and guide member is provided.

Another object of my invention is to provide a self-closing valve in which the size and weight is generally reduced.

Another object of my invention is to provide a self-closing valve requiring a minimum of parts for efficient operation.

Another object of my invention is to provide a self-closing valve with a very short control orifice which is completely protected from dirt and other deleterious matter.

Another object of my invention is to provide a one-piece piston and pilot of comparatively small diameter and light weight which assures alignment and makes possible close tolerances and quiet operation in a self-closing valve.

Another object of my invention is to provide a novel cut-off in a self-closing valve for progressively accelerating and decelerating cut-off of flow.

Another object of my invention is to provide a self-closing valve which cuts off the flow of any solid liquids under pressure or fast flow in a graduated manner without shock or hammer in the supply line.

Another object of my invention is to provide a self-closing valve which eliminates the possibility of loosening scale, rust, corrosion and other deleterious matter in supply lines.

Another object of my invention is to provide a self-closing valve in which molecular attraction of a liquid is utilized in controlling a piston therein.

Another object of my invention is to provide a self-closing valve which is packless and springless.

Another object of my invention is to provide a self-closing valve with a self-cleaning piston.

Another object of my invention is to provide a novel means for securing a washer on the bottom of a piston in a self-closing valve.

Another object of my invention is to provide novel means for limiting the movement of a piston in a self-closing valve, thereby controlling the amount of fluid passing through the valve.

Another object of my invention is to provide a remote controlled self-closing electrically operated valve.

Another object of my invention is to provide a self-closing valve in which the closing of the port therein is slow and gradual.

Another object of my invention is to provide a self-closing valve in which the piston therein moves with the pressure to close the port therein.

Another object of my invention is to provide a piston and guide therefor in a self-closing valve having critical clearances to control the opening and closing of the flow port in the valve.

Another object of my invention is to provide a comparatively small piston for a self-closing valve, thereby reducing the size and weight of the valve.

Another object of my invention is to provide the piston and guide for a self-closing valve of material having substantially the same coefficient of expansion as the body of the valve to prevent changes of clearance between the inner walls of the valve body and the piston upon changes in temperature.

Figure 2:
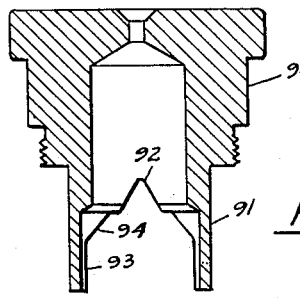

Other objects of my invention will become evident from the following detailed description, taken in conjunction with the accompanying drawings, in which Fig. 1 shows a vertical sectional view of an illustration of an embodiment of my novel, self-closing electrically operated valve, and Fig. 2 shows a vertical sectional view of a modified form of piston for my novel self-closing valve.

Referring now to the drawings, Fig. 1 shows a cylindrically shaped valve body 1 having laterally extending inlet and outlet ports 2 and 3 and a laterally extending inner partition 4 having a centrally disposed aperture or port 5 between the inlet 2 and the outlet 3 of the valve body 1. It will be evident that the inlet 2 and outlet 3 may be at right angles to each other or in any form without departing from the spirit of my invention. An enlarged threaded portion 6 is provided on the upper part of the valve body 1 and has seated thereon a flanged cap member 7 secured by a threaded locking member 8 threadably engaging the threaded portion 6 of the body member 1. The cap member 7 has a bevelled seating portion 60 for engaging a corresponding bevelled seating portion 61 on the upper end of the valve body 1 to provide metal to metal sealing contact. A piston 10 having a reduced stepped portion 11 and a further reduced threaded portion 12 reciprocates in the body member 1 and has a cylindrical guiding portion 13 with inverted V-shaped slots 14 which extend through the port 5 in the partition 4 to guide the lower end of the piston 10. It has been found that by rounding the edges 62 of the piston 10, quicker and more efficient operation of my novel valve may be obtained. A marginal beaded seating portion 15 is formed around the port 5 and engages a washer 16 which is secured to the shoulder portion 17 of the piston 10 by a threaded locking member 18 threadably engaging the threaded portion 12 of the piston 10. The piston 10 has a centrally disposed control orifice 20, with a tapered countersunk seat 21, leading into an enlarged orifice 22 in the lower portion of the piston 10. The tapered countersunk seat 21 is preferably countersunk with two different angular portions to permit greater flow of fluid. A reciprocated plunger 23 has a tapered seating portion 24 which engages the tapered seat 21 in the piston 10. The plunger 23 reciprocates in the bore 25 of an armature 26 which in turn reciprocates in a sleeve 27 supported by a flanged portion 28 on the lower end of aperture 29 in the flanged cap member 7. A conventional coil 30 is disposed around the sleeve 27 to electrically reciprocate the plunger 26 forming a solenoid of conventional type. The coil 30 is connected to a suitable electrical source by wires 31 so that it may be energized from any remote point. Coil 30 is disposed in a casing 32 which is supported on the top of the flanged cap member 7. The upper end of the armature 26 has a tapered projecting end 33 for engaging a tapered seating portion 34 in the end of an adjusting screw 35. The adjusting screw 35 is disposed in an aperture 36 of a screw member 37 and has a threaded portion 39 for engaging the internal threads 70 in the upper end of the sleeve 27. The screw member 37 has internal threads 38 for threadably engaging the outer threaded portion 71 on the upper end of the sleeve 27. A suitable washer 40 and gland member 41 are disposed in the threaded recess 42 in the upper end of the screw member 37. The adjusting screw 35 has a cross-slot 43 so that it may be rotated by a screwdriver or any other suitable tool. A threaded cap member 44 is threadably engaged with the outer threaded portion 45 of the screw member 37 to protect and cover the adjusting screw 43. A protective hood 46 is disposed over the coil 30 and casing 32 and it is held in place by the screw member 37 and a spring member 47. The plunger 23 has an elongated slot 50 longitudinally thereof through which is transversely disposed a pin 51 secured to the side walls of the armature, thereby permitting limited, free longitudinal movement of the plunger 23 in the bore 35 of the armature 26.

In operation, the solenoid coil 30 is energized, which pulls the plunger or armature 26 upwardly along with the plunger 23 into the sleeve 27. Liquid then passes from the chamber above the head of the piston 10 through the control orifice 20, thereby causing the pressure in the chamber above the piston 10 to decrease materially below the pressure in the supply lines. Because of this decrease in pressure in the upper portion of the body member 1, the piston 10 rises, thereby moving the washer 16 away from the seat 15. The inverted V-shaped ports 14 in the guide portion 13 of the piston member 10 permits the liquid to increase its flow gradually from the inlet 2 to the outlet 3 until the piston 10 is raised to the upper end of the body member 1 wherein full flow of the liquid takes place through the flow port 5 of the partition 4. The coil 30 is then deenergized wherein the tapered seating portion 24 of the plunger 23 seats on the tapered seat 21 in the head of the piston 10, thereby stopping the flow of fluid through the control orifice 20. Liquid will then pass upwardly into the chamber above the piston 10 between the outer portion of the piston 10 and the inner side wall of the body member 1. It has been found that when the clearance between the piston 10 and the side wall of the body member 1 is from one to three thousandths of an inch, the liquid will pass to the chamber above the piston 10 gradually, thereby moving the piston 10 downwardly in a slow and easy manner and closing the port 5 gradually. As the piston member 10 moves downwardly, the inverted V-shaped slots 14 in the guiding portion 16 of the piston member 10 gradually tapers off the flow from the inlet 2 to the outlet 3 of the body member 1 until the washer 16 seats on the seating portion 15 and completely closes the port 5 to the flow of fluid. The gradual tapering off or cutting off of the flow of fluid through the port 5 prevents shock and hammer, and resultant noise in the supply lines, and it is so evenly graduated or tapered off that the closing of the valve sets up no vibrations in the valve or supply lines. The clearance between the outer side of the guide portion 13 and the inner side of the port 5 has been found to be preferably from one to three thousandths of an inch for the most efficient operation to prevent too great a flow of fluid between the outer side of the guide portion 13 of the piston member 10 and the port 5. It will be evident that the small clearance between the outer side of the piston 10 and the inner wall of the body member 1 filters out all dirt and other deleterious matter that might pass to the chamber above the piston 10 so that the control orifice 20 will not be clogged up by any matter passing therethrough. The control orifice 20 is also made very short to assure freedom from clogging.

By providing a tapered seat 21 in the upper head portion of the piston member 10 and a tapered seating portion 24 on the plunger 23, these surfaces will tend to be held apart by the film of liquid flowing therebetween and in this manner I utilize an adjustable limiting member 35 to limit the movement of the armature 26 and therefore limit the movement of the plunger 23 to predetermined the amount of movement of the piston 10 and therefore the amount of liquid passing from the inlet 2 to the outlet 3 of the body member 1. The adjustable member 35 may be adjusted longitudinally by means of a screwdriver, thereby limiting the upward movement of the armature 26. By providing a tapered seat 21 in the head of the piston 10, tapered seating portion 24 of the plunger 23 will always be in alignment with the control orifice 20 in the piston 10.

Because the efficient operation of my self-closing valve depends upon critical clearances, it will be evident that the material of the piston member 10 and the body portion 1 of the valve must have substantially the same coefficient of expansion in order to operate efficiently at all temperatures. The flow of the liquid by-passing the piston 10 to the chamber above the piston 10 determines the speed of the closing action of the piston 10 in my novel valve. I have found that clearances of one to three thousandths of an inch with sixty-five pounds pressure in the line will give the piston 10 a slow and easy action whereas clearances above five thousandths of an inch cause violent snap action closing of the piston 10 with resultant shock and hammer. Closing the valve against the pressure is not particularly difficult but in a valve of the construction of my novel valve wherein the piston 10 closes with the pressure, it has heretofore been difficult to prevent snap action closing. I have provided novel means for preventing snap action closing with resultant shock and hammer in a self-closing valve. My novel piston 10 acts somewhat as a check valve in that it must close under certain conditions as it moves with the pressure. The by-pass control orifice 20 in my novel device is very short, thereby minimizing the possibility of clogging or inefficient operation. Because my novel piston closes with the pressure, a comparatively small piston is required. The unitary nature of my novel combined piston and pilot and the compactness of the valve in general, results in economy of manufacture, reduction of size and weight, economical maintenance, and minimum of wear.

In Fig. 2, I have shown a piston 90 having a guiding portion 91 with the short inverted V-shaped slot 92, a straight portion 93, and an angularly disposed portion 94 of less angularity than the V-shaped slot 92 between the straight portion 93 and the V-shaped slot 92. This piston permits a greater flow of fluid and quicker closing while still cushioning the piston 90 to prevent shock and hammer in the fluid line.

Various changes may be made in the specific embodiment of my invention without departing from the spirit thereof or from the scope of the appended claims.

What I claim is:

1. A self-closing valve comprising a valve body having an inlet and an outlet and a partition between said inlet and said outlet having a centrally disposed aperture, a stepped piston reciprocable in said valve body having an axially extending control orifice with a countersunk seat in the large end thereof, said control orifice being comparatively short and having one end thereof enlarged, a reduced guiding portion on the small end of said stepped piston with inverted V-shaped slots circumferentially disposed therearound in spaced relationship movable in the aperture in said partition, the clearances between the outermost side of said piston and the inner wall of said valve body and the outer side of said guiding portion and the inner side of said aperture in said partition being predetermined, a reciprocable plunger having a tapered seating surface for engagement with the countersunk seat in the end of said piston, and an armature of a solenoid associated with said plunger for actuating same.

2. A self-closing valve as set forth in claim 1 wherein a longitudinally adjustable stop member is disposed in the upper end of a sleeve with an electrical winding therearound, and said plunger is reciprocable with an armature in said sleeve, the longitudinal movement of said plunger and therefore the movement of said piston being adjustably limited by said adjustable stop member.

3. A self-closing valve as set forth in claim 1 wherein the inverted V-shaped slot in said guide portion of said piston is comparatively short and the sides of the slot merge into an angular portion of greater angularity which in turn merges with straight inner sides of said guide portion.

4. A self-closing valve as set forth in claim 1 wherein said piston has the outer edges thereof rounded.

5. A self-closing valve comprising a valve body having an inlet and an outlet and a partition having an aperture centrally thereof, a flat headed, stepped piston movable in said valve body having a guiding portion with inverted V-shaped slots movable in said aperture in said partition and having an axially extending, comparatively short control orifice with a tapered countersunk seat in the head thereof, the clearance between said piston and the inner side of said valve body and the outer side of said guiding portion and the inner side of the aperture in said partition being one to three thousandths of an inch, a reciprocating plunger having a tapered seating surface for engaging the tapered seat in the head of said piston for closing off the flow of fluid through said control orifice and for limiting the upward movement of said piston, an armature attached to asid plunger, an electrical coil for moving said armature and plunger into and out of engagement with the seat in said control orifice in said piston, and adjustable means in alignment with said armature for limiting the longitudinal movement thereof and said plunger thereby limiting the upward movement of said piston and consequently the opening of said valve, said plunger and said control orifice being self-centering.

6. A self-closing valve comprising a valve body having an inlet and an outlet and a partition having a flow port, a flat headed, stepped piston movable in said valve body having a guiding portion with inverted V-shaped slots movable in said port in said partition and having a centrally disposed, comparatively short control orifice with a tapered seat in the head thereof, a plunger having a tapered seating surface for engaging the tapered seat in the head of said piston for closing off the flow of fluid to said control orifice and for limiting the upward movement of said piston, an armature in which said plunger is telescopically disposed, a sleeve in which said armature reciprocates, an electrical coil around said sleeve for reciprocating said armature and thereby moving said plunger into and out of engagement with the seat in said control orifice in said piston, and a longitudinally movable stop member in said sleeve for adjustably limiting the longitudinal movement of said armature and plunger to control the opening of said piston, the clearances between the outer side of said piston and the inner side of said valve body and the outer side of said guiding portion on said piston and the inner side of said port in said partition being predetermined and approximately alike.

WESLEY G. MILLER.

REFERENCES CITED

The following references are of record in the file of this patent:

UNITED STATES PATENTS

| Number | Name | Date |
|---|---|---|
| 412,789 | Probert | Oct. 15, 1889 |
| 599,462 | Van Schank | Feb. 22, 1898 |
| 795,715 | Lofton | July 25, 1905 |
| 1,106,757 | Wagner | Aug. 11, 1914 |
| 1,176,754 | Hedges | Mar. 28, 1916 |
| 1,777,262 | Grainger | Sept. 30, 1930 |
| 1,845,055 | Miller | Feb. 16, 1932 |
| 1,885,846 | Littlefield | Nov. 1, 1932 |
| 1,981,230 | Glab | Nov. 20, 1934 |
| 1,998,239 | Irwin | Apr. 16, 1935 |
| 2,251,441 | Dillman | Aug. 5, 1941 |
| 2,285,323 | Beekley | June 2, 1942 |
| 2,435,076 | Hall | Jan. 27, 1948 |

FOREIGN PATENTS

| Number | Country | Date |
|---|---|---|
| 3,962 | Great Britain | of 1880 |
| 10,978 | Great Britain | of 1887 |
| 20,187 | Great Britain | of 1904 |
| 325,186 | France | of 1902 |